United States Patent [19]
Mochizuki et al.

[11] Patent Number: 5,636,071
[45] Date of Patent: Jun. 3, 1997

[54] SPEED REDUCTION DEVICE FOR AN ELECTRICALLY POWERED FOLDABLE REARVIEW MIRROR

[75] Inventors: Toshihiro Mochizuki; Kazunari Yamauchi; Masahiko Ito, all of Fujieda; Yoshihiko Narukawa, Yqizu, all of Japan

[73] Assignee: Murakami Kaimeido Co., Ltd., Shizuoka, Japan

[21] Appl. No.: 472,868

[22] Filed: Jun. 7, 1995

[30] Foreign Application Priority Data

Aug. 25, 1994 [JP] Japan .................. 6-11588 U

[51] Int. Cl.⁶ .............. G02B 5/08; G02B 7/182; B60R 1/06
[52] U.S. Cl. .............. 359/877; 359/841; 359/850; 359/871; 359/872; 359/875; 359/876; 248/476; 248/479
[58] Field of Search ............... 359/877, 876, 359/875, 871, 850, 872, 841; 248/476, 478, 479, 487

[56] References Cited

U.S. PATENT DOCUMENTS

| 5,315,442 | 5/1994 | Sato et al. | 359/877 |
| 5,339,192 | 8/1994 | Cho | 359/877 |
| 5,477,392 | 12/1995 | Mochizuki et al. | 359/841 |

FOREIGN PATENT DOCUMENTS

| 223923 | 6/1993 | European Pat. Off. | 359/872 |
| 4023375 | 1/1992 | Germany | 359/877 |
| 63-82844 | 4/1988 | Japan . | |
| 237235 | 9/1989 | Japan | 359/877 |
| 4-04189638 | 7/1992 | Japan | 359/877 |

OTHER PUBLICATIONS

M-734, vol. 12 #311 Aug. 24, 1988 JPX.

*Primary Examiner*—Paul M. Dzierzynski
*Assistant Examiner*—Mohammad Y. Sikder
*Attorney, Agent, or Firm*—Michael J. Striker

[57] ABSTRACT

The speed reduction device for the electrically powered foldable rearview mirror includes a two stage speed reduction worm mechanism connecting an electrically powered motor for folding the rearview mirror which is fixed on a frame of a mirror body and a clutch gear engageably and removably mounted on a shaft which stands on a base and on which the mirror body is rotatably mounted. The first stage worm of the speed reduction worm mechanism is a twin gear including a worm screw portion with a coaxial spur gear on an end thereof. The second stage worm is a twin gear including a worm screw portion with a coaxial worm wheel on an end thereof. The spur gear of the first stage worm is engaged with a pinion mounted on an output shaft of the motor but the axis of the worm screw portion of the first stage worm is parallel with the motor output shaft. The worm wheel of the second stage worm engages the worm screw portion of the first stage worm and the worm screw portion of the second stage worm is engaged with the clutch gear. When the electrically powered foldable rearview mirror using the worm mechanism is rotated to the erected state and to the folded state, the thrust reaction on the worms of the speed reduction mechanism is not transmitted to the motor shaft.

5 Claims, 2 Drawing Sheets

SPEED REDUCTION DEVICE FOR AN ELECTRICALLY POWERED FOLDABLE REARVIEW MIRROR

BACKGROUND OF THE INVENTION

1. Field of the Invention

The present invention relates to an electrically powered foldable rearview mirror and, more particularly, to a speed reduction device for an electrically powered foldable rearview mirror for automobiles which is improved so that a thrust reaction on a worm is not transmitted to a motor shaft.

2. Description of Related Prior Art

The electrically powered foldable rearview mirror for automobiles includes an electrically powered motor for folding the mirror which is fixed on a frame of a mirror body, a gear engageably and removably mounted on a shaft which stands on a base and on which the mirror body is mounted, and a speed reduction device located between the motor and the gear.

The gear is provided around the shaft and has a clutch function, being fixed on the shaft during electrical rotation of the mirror and being free of the shaft during forced rotation of the mirror, and the erected or folded state of the mirror body is reached by rotation of the frame about the gear. A worm is directly pressed into an output shaft of the electrically powered motor for folding to transmit the driving force to the gear via the speed reduction gear train following a worm wheel engaging the worm.

The driving force is transmitted from the worm which is mounted on a motor output shaft to the worm wheel and the worm is moved in an axial direction by a reacting rotation force (thrust reaction) due to a transmitted load. Due to the thrust reaction on the output shaft, an end of the output shaft is decentered and the motor is overloaded abnormally, and abrasion of the motor components is accelerated.

As disclosed by Japanese Published Patent Application No. Hei 6-74500, the electrically powered foldable rearview mirror is provided with a claw coupling (a loose fit coupling) with a clearance between an end of the output shaft of the electrically powered motor for folding the rearview mirror and an end surface of the worm, and the motor output shaft is prevented from the thrust reaction. In the electrically powered foldable rearview mirror described above, a penetrating portion which has a width between flat surfaces defined by a pair of chamfered portions is provided at the end of the motor output shaft and is inserted to engage a grooved portion which is provided on a motor adjacent end of a worm shaft so as to transmit the driving force.

In the system described above, the chamfered portions of the motor output shaft end contact a wall of the worm shaft end and the driving force is transmitted, thus rotating the worm. Furthermore the claw coupling is formed so that the chamfered portions of the motor output shaft are inserted in the groove formed on the end of the worm so that the end surface and the root of the chamfered portions do not contact the top and the bottom of the groove so that the thrust reaction on the worm is not transmitted to the motor. Since the loose fit coupling forming the claw coupling of the motor shaft and the worm is small, the worm repeats normal or reverse rotation every time the mirror body rotates into the erected state or the folded state, and the driving force cannot be sufficiently transmitted due to an abrasion caused on contact of the plane corner of the motor output shaft side and the groove wall of the worm shaft side.

SUMMARY OF THE INVENTION

The object of the present invention is to provide a speed reduction device for an electrically powered foldable rearview mirror, improved with reference to the problems described above, and capable of completely preventing the motor output shaft or other transmission shaft from hazardous load due to an axially directed thrust reaction caused by a force transmission from the worm gear.

To achieve the object described above, the electrically powered foldable rearview mirror of the present invention has an electrically powered motor fixed on a frame of a mirror body for folding the mirror body electrically, a clutch gear removably mounted on a shaft which stands on a base and on which the mirror body is rotatably mounted and a multistage speed reduction worm mechanism mounted between and connecting the motor and the clutch gear. The worm mechanism has a spur gear formed at an upper end of a first stage worm and engaged with a pinion mounted on the motor shaft to prevent transmission of thrust reaction from the worm mechanism to the motor shaft.

According to one of the preferred embodiments of the present invention, the speed reduction device for an electrically powered foldable rearview mirror, the rearview mirror comprising a base; a shaft standing on the base; a mirror body rotatably mounted on the shaft, the mirror body including a frame having a root portion and a motor mounted on the root portion of the frame to rotate the mirror body and having an output shaft provided with a pinion mounted on the output shaft; and a clutch gear engageably and removably mounted on the shaft; and wherein the speed reduction device comprises a multistage speed reduction worm mechanism assembled in the frame root portion to connect the motor output shaft and the clutch gear, the multistage speed reduction worm mechanism comprising a plurality of worms including a final stage worm provided with an end gear engaged with the clutch gear and a first stage worm provided with a spur gear at a top end thereof, the spur gear engaging the pinion so as not to transmit a thrust reaction from the multistage speed reduction worm mechanism to the motor output shaft.

Furthermore in a preferred embodiment of the device as described above, the multistage speed reduction worm mechanism comprises a two stage speed reduction worm train, the first stage worm is a twin gear composed of the first worm screw portion and the spur gear formed on an end of the worm screw portion, and the second stage worm is a twin gear composed of the second Worm screw portion which engages the clutch gear and a worm wheel formed on an end of the worm screw portion to engage the worm screw portion of the first stage worm.

As described above, the spur gear of the first stage worm engages the pinion which is mounted on the output shaft of the motor. Both teeth of the spur gear and the pinion extend in a gear axial direction, and the engaged position of the spur gear in the pinion is merely dislocated due to the thrust reaction on the worm shaft to prevent transmission of the thrust reaction to the motor output shaft from an irregular effect.

The above and further objects, details and advantages of the present invention will become apparent from the following detailed description of preferred embodiments thereof, when read In conjunction with the accompanying drawings.

DETAILED DESCRIPTION OF THE PREFERRED EMBODIMENTS

Figure 1:
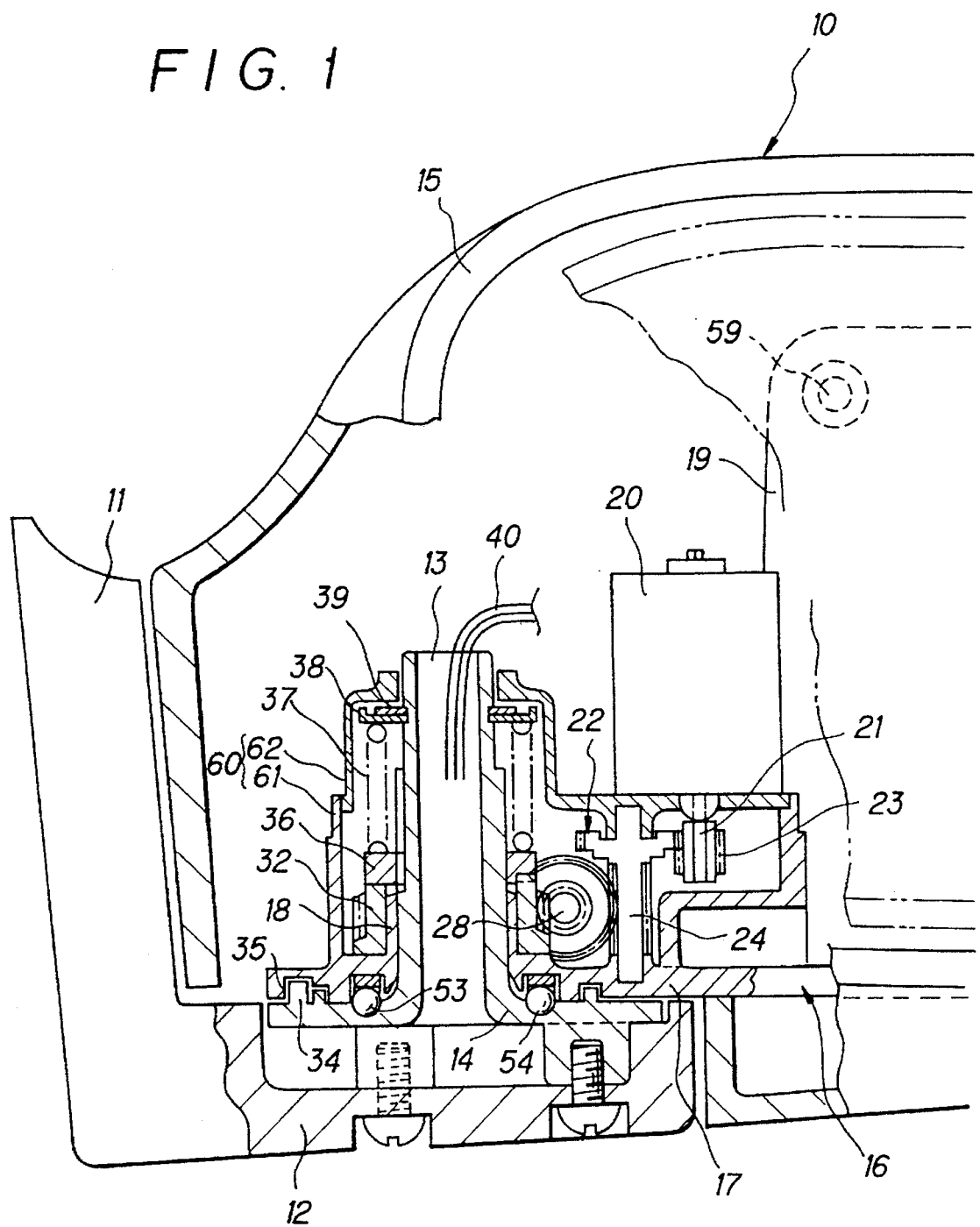
FIG. 1 is a partially cut-away plan, partially cross-sectional view of an electrically powered foldable rearview mirror according to the preferred embodiment of the present invention.

As shown in FIG. 1, an electrically powered foldable rearview mirror assembly 10 according to the invention comprises a mirror body 15 and a frame 16 mounted in the mirror body and engaged with a shaft 13 which stands on an extension 12 of a base 11 so that the mirror body 15 is rotatably supported in an erected and a folded state. The frame 16 comprises a root portion 17 provided With a sleeve 18 through which the shaft 13 extends and a wing portion 19 which extends substantially vertically from the root portion 17. The front surface of the wing portion 19 is provided with an actuator unit (not shown) which is fixed on an inner wall of the mirror body 15 by a screw 59 so as to adjust the mirror reflecting angle.

An electric powered driving device (motor) 20 and a speed reduction mechanism 22 are mounted on the root portion 17 of the frame 16. A gear 32 is mounted on the shaft 13 and has a clutch function, being fixed on the shaft during normal use and being free of the shaft during forced rotation. The final stage of the speed reduction mechanism 22 engages the gear 32 to rotate the mirror body electrically or forcibly. The bottom surface of the frame root portion 17 provides a bearing surface on a sliding portion 47 which bears on a top surface of the shaft base portion 14. Rotation stop means is provided comprising a protruding element 34 protruding from the shaft base portion 14 and an arc-shaped groove 35 provided in a bottom surface of the root portion 17 for engaging the protruding element (FIG. 1 and FIG. 2).

A clutch plate 36, a coil spring 37, a spring retaining element 38 and a clamp 39 are mounted on the gear 32 which is supported on the shaft 13 so as to constantly elastically contact the clutch plate 36 on the gear 32 (FIG. 1).

Figure 2:
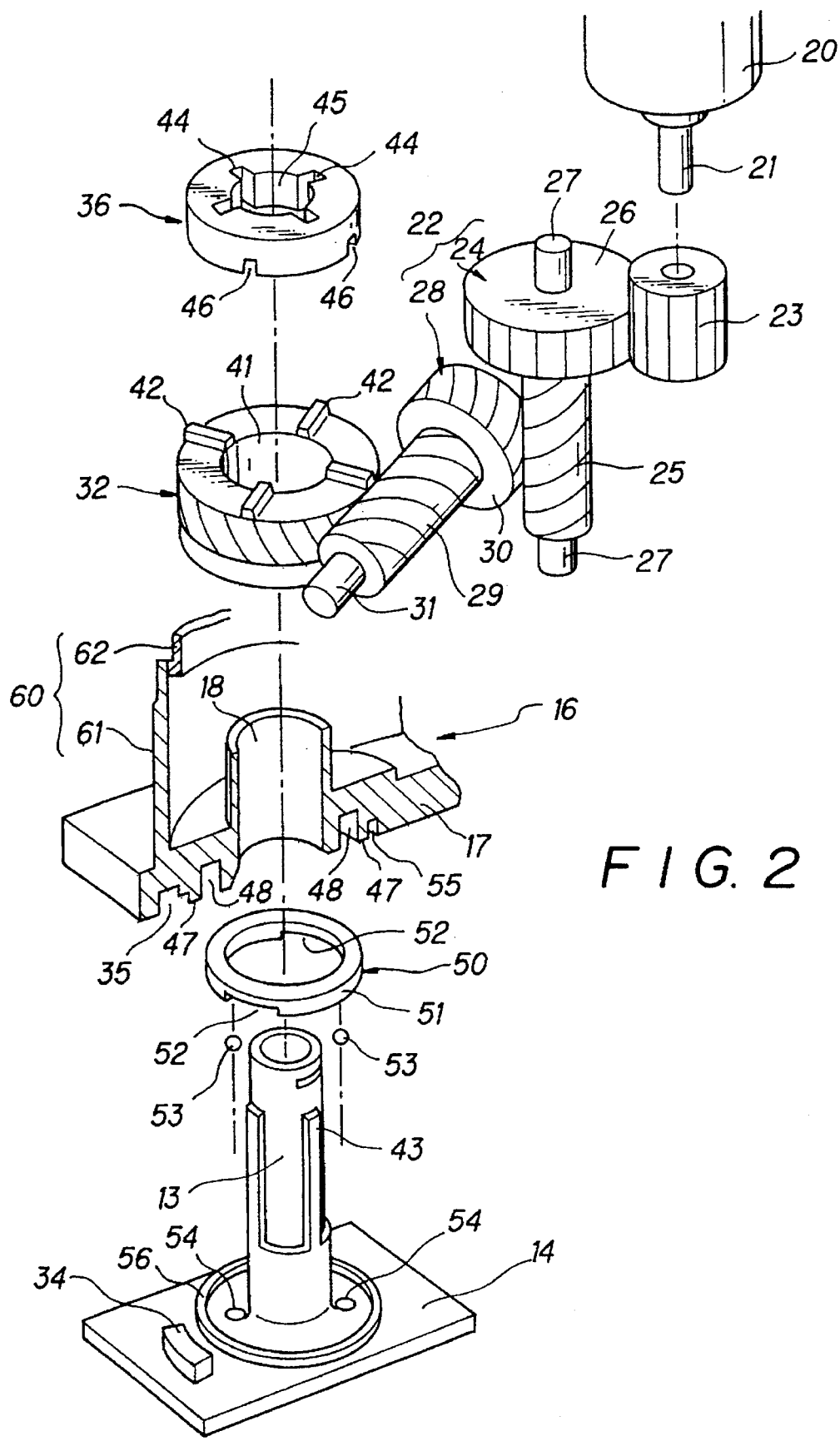
FIG. 2 is a detailed exploded perspective view of speed reduction mechanism for the rearview mirror of FIG. 1.

As shown by FIG. 2, the speed reduction mechanism 22 is composed of the first stage worm 24 and the second stage worm 28. The first stage worm 24 is a twin gear comprising a spur gear 26 and an adjacent coaxial worm screw 25 and the second stage worm 28 is a twin gear comprising a worm wheel 30 and an adjacent coaxial worm screw portion 29. The spur gear 26 is formed on an end of the first stage worm 24 and engaged with a pinion 23 which is pressed onto the motor shaft 21. Furthermore a worm wheel 30 is formed on an end of the second stage worm 28 and engaged with the worm screw 25 of the first step worm 24 and the worm screw 29 of the second step worm 28 is engaged with the clutch gear (worm wheel) 32 which is engageably and removably mounted on the shaft 13. Respective shaft ends 27, 31 of worms 24, 28 extend through respective shaft holes which are provided in the frame of the mirror body and are supported in a center impeller manner. A vertical wall 61 extends from the frame root portion 17 and is coaxial to the shaft. A gear box 60 is formed by a covering top plate 62 connected to the wall 61. Numeral 40 designates a cable passing through the shaft hollow portion to control the driving device or motor (FIG. 1).

The clutch gear 32 is a worm wheel engaged with the worm screw portion 29 of the second stage worm 28. Several radial protruding elements 42 are provided on the top surface of the clutch gear 32 and several radial recesses 46 are formed on the under surface of the clutch plate 36 to engage the radial protruding elements 42 of the gear 32. The clutch gear 32 is provided with a hole 41 through which the shaft extends and is provided with several radial protruding elements 42 (four elements are shown by FIG. 2) on the top surface thereof. The clutch plate 36 also is provided with a hole 45 through which the shaft 13 extends. Key grooves 44 are formed in the clutch plate 36 in the hole 45 to engage keys 43 provided on the shaft 13 so that the clutch plate 36 is held nonrotatably on the shaft and is movable in the shaft axis direction with the keys 43 engaged in the key grooves 44 of the clutch plate 36.

In the speed reduction device of the present invention, the motor 20 is normally or reversely actuated to rotate the worm screw portion 29 of the second stage worm 28 which is the last stage gear of the speed reduction mechanism 22, the gear 32 is fixed on the shaft 13, and the whole frame 16 is rotated around the shaft 13 to rotate the mirror body in the folded direction or the erected direction.

When the speed reduction mechanism 22 is actuated and the thrust reaction occurs on first and second stage worms 24, 28, since respective shaft ends 27, 31 of worms 24, 28 are inserted in the shaft holes provided in the frame 16 of the mirror body and are mounted in a center impeller manner, the thrust reaction cannot be transmitted at the engaged gear elements which can move to and fro. Especially respective teeth of the spur gear 26 of the first stage worm 24 and of the pinion 23 which engages the spur gear 26 extend in the same axial direction as the shaft, so that the thrust reaction merely dislocates the engagement of the pinion with the spur gear, and the motor 20 is not unduly loaded.

As described in U.S. patent application Ser. No. 08/159,439, now patented with U.S. Pat. No. 5,477,392, the top surface of the shaft base portion 14 and the frame root portion 17 provide bearing surfaces at the sliding portion 47 and rotation stop means comprises a protruding element 34 projecting from the shaft base portion 14 and an arc-shaped groove 35 provided in the bottom surface of the root portion 17 for engaging the protruding element.

Besides the rotation stop means, locating means is mounted on the bottom portion of the frame root portion 17. The locating means includes an annular recess 48 formed on the inside of the ring-shaped sliding portion 47 and a ring-shaped plate stopper 50 which is mounted in the annular recess 48. The plate stopper 50 is provided with a main body 51 formed with concave portions 52, 52 at symmetrical positions in the under surface thereof and steel balls 53, 53 disposed in concave portions 52, 52. Steel balls 53, 53 are supported in respective hemispherical cavities 54 which are formed in the top surface of the shaft base portion 14. Furthermore an annular recess 55 is formed in the top surface of the shaft base portion 14 inside of the arc-shaped groove 35 in which a shaft rib 56, which protrudes from the top surface of the shaft base portion 14, is engaged. The arc-shaped recess 35, the annular recess 55 and the annular recess 48 are respectively formed concentric to the shaft (FIG. 2). The mirror body 15 is rotated under electrical power, in accordance with the frame, and steel balls 53, 53 contact shoulders of concave portions 52, 52 in the erected state and the folded state to control the rotating and stopping position of the mirror body.

The locating means comprises the plate stopping element 50 and the steel balls 53. A first barrier is defined by a shaft rib 56 and the annular recess 55 and a second barrier is defined by the ring-shaped sliding portion 47 to double protect the locating means from water, dust, foreign contamination or the like. Because of these twin barriers the rotatability of the steel balls is maintained to accurately control the mirror body location during rotation and its halting position.

As described above, according to the above-described embodiment of the invention, the shaft directing thrust reaction on the worm of the speed reduction mechanism is not transmitted to the motor shaft, the mechanism has improved durability and the motor output shaft need not have a narrow width between flat surfaces. Furthermore the motor does not experience an extra load, and the strength and the ease of assembly of the device are improved.

We claim:

1. A speed reduction device for an electrically powered foldable rearview mirror, said rearview mirror comprising a base; a mirror body shaft standing on the base; a mirror body mounted rotatably around the mirror body shaft; a frame mounted in the mirror body and having a root portion; a motor mounted on the root portion of the frame for rotating the mirror body and having an output shaft; a pinion mounted on the output shaft and a clutch gear mounted on the mirror body shaft;

wherein the speed reduction device is a multi-stage speed reduction worm mechanism mounted on the root portion of the frame for making a connection to the motor output shaft, and the worm mechanism consists of a spur gear engaging the pinion on the output shaft of the motor, a first worm screw portion connected to and coaxial with the spur gear, said first worm screw portion having an axis extending parallel to the output shaft of the motor, a worm gear engaging the first worm screw portion and a second worm screw portion connected to and coaxial to the worm gear engaging the first worm screw portion, said second worm screw portion, connected to the clutch gear and being an end gear of the speed reduction worm mechanism; and the clutch gear mounted on the mirror body shaft engages the end gear of the speed reduction worm mechanism.

2. The speed reduction device as defined in claim 1, wherein the spur gear and the first worm screw portion coaxial therewith are provided with gear shaft ends and the gear shaft ends are inserted and supported in a center impeller manner in the frame of the mirror body and the worm gear and the second worm screw portion coaxial therewith are also provided with gear shaft ends inserted and supported in said center impeller manner in the frame of the mirror body.

3. The speed reduction device as defined in claim 1, wherein the clutch gear engageably and releasably mounted on the mirror body shaft and the mirror body shaft has a mirror body shaft axis and a flange portion; and further comprising a coil spring mounted around the mirror body shaft; a clutch plate, said clutch plate being mounted nonrotatably, but axially movable on the mirror body shaft between the coil spring and the clutch gear, the clutch plate being pressed on an upper surface of the clutch gear by action of the coil spring so as to permanently actuate the clutch gear; and rotation stop means for the mirror body arranged between the flange portion and the frame root portion.

4. The speed reduction device as defined in claim 3, wherein the clutch gear is provided with a plurality of radial projecting elements projecting from the upper surface of the clutch gear and the clutch plate has a lower surface and is provided with a corresponding plurality of radial notches on said lower surface for engaging the radial projecting elements.

5. The speed reduction device as defined in claim 3, wherein the flange portion of the mirror body shaft includes an upper surface and the root portion of the frame includes a lower surface, and the rotation stop means comprises a plurality of projecting elements protruding from the upper surface of the flange portion and a plurality of arc-shaped grooves formed in the lower surface of the frame root portion so that the projecting elements engage in the arc-shaped grooves.

* * * * *